United States Patent [19]

Gilb

[11] Patent Number: 4,572,695
[45] Date of Patent: Feb. 25, 1986

[54] SIX FINGER WOOD JOINTING CONNECTOR

[75] Inventor: Tyrell T. Gilb, Berkeley, Calif.

[73] Assignee: Simpson Strong-Tie Company, Inc., San Leandro, Calif.

[21] Appl. No.: 642,382

[22] Filed: Aug. 20, 1984

[51] Int. Cl.⁴ .......................................... F16B 15/00
[52] U.S. Cl. ................... 403/232.1; 403/14; 403/230; 403/403; 403/405.1; 52/702; 248/300
[58] Field of Search ............... 403/11, 14, 232.1, 230, 403/231, 233, 234, 403, 405; 52/289, 702; 248/DIG. 9, 903, 916, 300, 558

[56] References Cited

U.S. PATENT DOCUMENTS

| | | |
|---|---|---|
| 437,592 | 9/1890 | Goetz . |
| 1,714,814 | 5/1929 | Plimpton .............................. 248/300 |
| 1,945,925 | 2/1934 | Stiefel . |
| 2,037,736 | 4/1936 | Payne et al. ..................... 403/231 X |
| 2,413,362 | 12/1946 | Maxwell et al. ................. 403/230 X |
| 2,638,643 | 5/1953 | Olson . |
| 2,666,238 | 1/1954 | Hagedorn . |
| 2,700,520 | 1/1955 | Skubic . |
| 2,895,186 | 7/1959 | Franks . |
| 4,230,416 | 10/1980 | Gilb ................................. 403/232.1 |
| 4,291,996 | 9/1981 | Gilb ....................................... 403/14 |

OTHER PUBLICATIONS

Popular Science, Aug. 1964, pp. 137–140.

Primary Examiner—Cornelius J. Husar
Assistant Examiner—Todd G. Williams
Attorney, Agent, or Firm—James R. Cypher

[57] ABSTRACT

A jointing connector made from a sheet metal blank for connecting two to four wood members such as 2×4's. The connector includes a palm portion, and a finger portion with six distinct finger members. Each finger may be bent in the field by workmen to accommodate the particular jointing of the wood members. Preferably, the connector is bent in a U-shape at the factory. Three types of nail openings are provided including circular, slotted and directional slotted tab openings. The different types of openings with the configuration of the connector enable workmen to use the same connector in nearly a universal application to all types of jointing configurations. Further, the use of the special nail openings and the connector permit many of the nails to be used in double shear applications so that the connection value is doubled.

6 Claims, 16 Drawing Figures

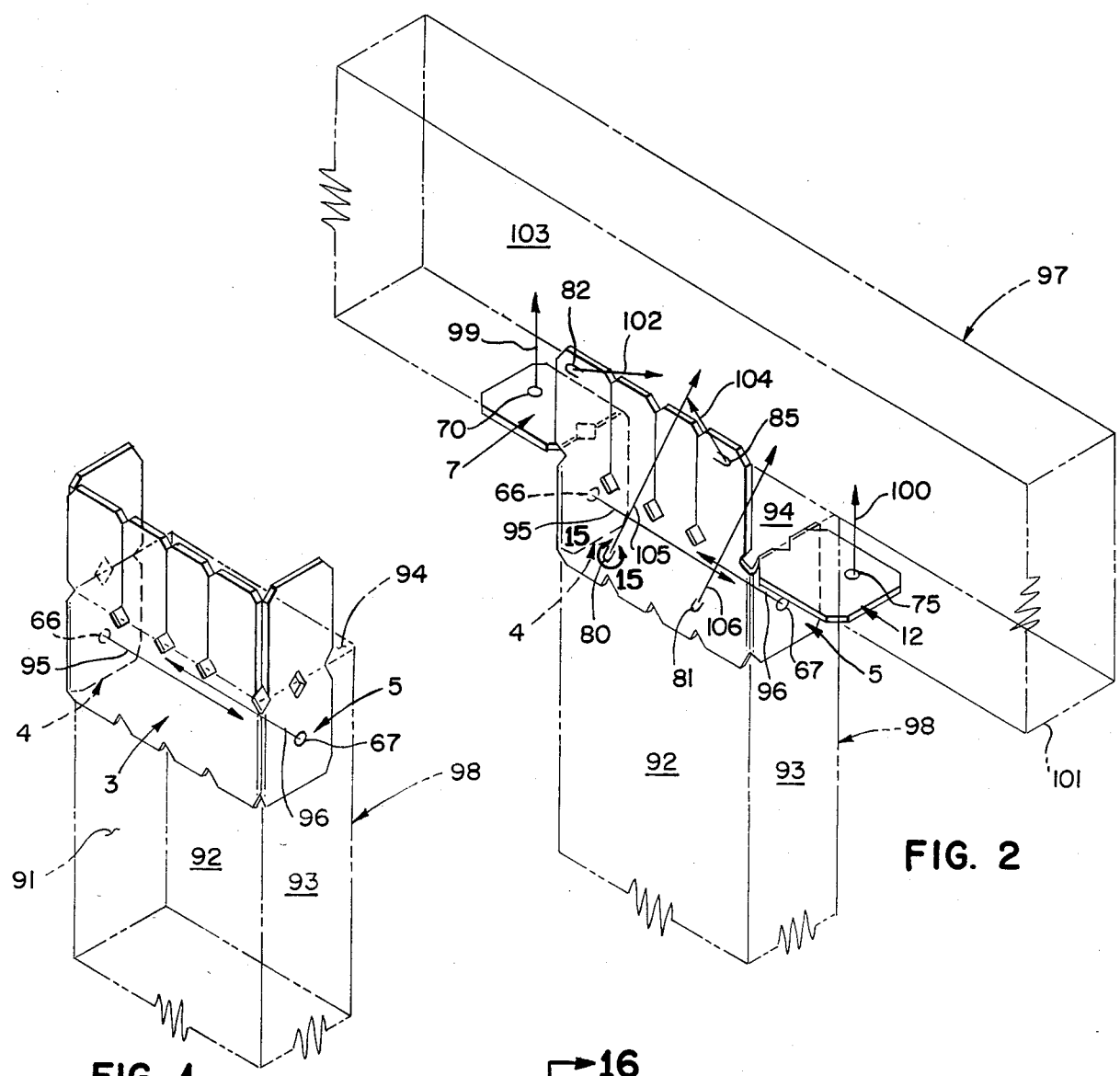
FIG. 1
FIG. 2
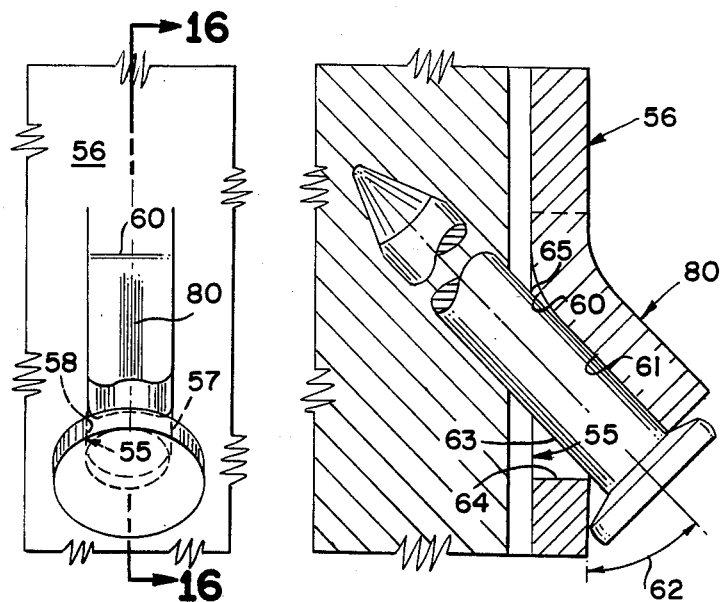
FIG. 15
(PRIOR ART)
FIG. 16
(PRIOR ART)

SIX FINGER WOOD JOINTING CONNECTOR

BACKGROUND OF THE INVENTION

This invention relates to sheet metal connector used for connecting one end of a wood member to one or more wood members; sometimes referred as jointing connectors. The jointing connector of this invention is to be distinguished from those sheet metal connectors which support one wood member with respect to another and are generally known as hangers. The distinction between these two classes of connectors is not an inflexible definition and the present invention can in some instances be used as a hanger.

Historically, the connection of the end of a wood element to other wood elements has been accomplished by toenailing or through-nailing. Because toenailing tends to split the wood ends even when the jointing is accomplished by a skilled carpenter, and because the connection is limited in strength, various specialized jointing connectors have been manufactured and used over the years. Timber connectors have been used on a limited basis since colonial times and one of the early castings is shown in Goetz, U.S. Pat. No. 437,592, 1890. A sheet metal connector is shown in Stiefel, U.S. Pat. No. 1,945,925, 1934, and a connector to be used without fasteners is taught by Payne, U.S. Pat. No. 2,037,736, 1936. Widespread use, however, was not made of sheet metal connectors for jointing until the last twenty-five years. Simpson Strong-Tie Co., Inc. of San Leandro, Calif. and others have created a group of general and specific metal connectors to accomplish such jointing. These are typlified by the A35 Framing Anchor, FC Framing Clips, and various angles, tie plates, and clips.

Other jointing connectors are disclosed by Maxwell, U.S. Pat. No. 2,413,362, 1946; Olson U.S. Pat. No. 2,638,643, 1953; Hagedorn, U.S. Pat. No. 2,666,238, 1954; Skubic, U.S. Pat. No. 2,700,520, 1955; and Franks, U.S. Pat. No. 2,895,186, 1959.

While some of these jointing connectors accomplished specific connections quite well, and other connectors when used in multiples or in combination with related connectors were able to approach the "universal" status for connecting a number of different types of wood connections, no single connector, however, has been found which truly attains the distinction of being a "universal" jointing connector, capable of joining almost all types of jointing, and accomplishing that purpose with a minimum number of connectors, with a minimum number of fasteners, and achieving a structurally sound connection.

SUMMARY OF THE INVENTION

The gist of the present invention is the use of a basically rectangular sheet metal blank which is normally bent in the shape of a simple U-shaped, and utilizing the anatomical analogy of the hand, has a base or palm portion and six fingers, formed for bending in either direction to the plane of the base or palm portion. Each finger and the palm portion is formed with fastener openings. Preferably, in addition to the standard circular fastener openings, each finger and the palm portion is formed with slotted, or tab openings which permit the fasteners to be driven at an angle to the face of the palm portion or the finger.

The main objective of the present jointing connector is to connect the end of one wood member, in any aspect, to one, two, or even three like members, also in any aspect, in relation to the end of the first member. Although the primary product is intended for the most common use with nominal 2×4 lumber, a functionally identical product, appropriately dimensioned, could be used for sizes such as 2×3, 2×6 and other nominally sized dimensional lumber.

Another objective is to provide a "universal" connector which can be used to facilitate the erection of small frame structures, primarily using 2×4 members, for the end purpose of providing sheds, storage rooms, greenhouses, and similar light framed structures.

By eliminating the need to toenail the joints, the connector is especially helpful to the unskilled workmen and the do-it-your-selfers. Because of other advantages, however, even the most skilled carpenter will find it advantageous to use the present connector.

The use of an initial U-shape in the connector provides partial self-jigging in attaching the device to an end of a wood member. The use of equal length fingers gives an automatic visual reference point in initially attaching the device to the end of a wood member.

The key to the success of the present connector in meeting the requirements of a universal attachment device was the use of six fingers extending beyond the base or palm portion of the device. While an anatomical analogy would have indicated five fingers, the breakthrough did not occur until the use of six fingers was established.

The numerically incorrect anatomical analogy was also further violated in that the fingers were constructed to bend backward as well as forward. The sheetmetal was formed so that the bends could be made easily to the field to meet the particular jointing requirement. Except for a simple U-shaped bend made at the factory, all other bends are made in the field because it is simply not feasible or even practical to anticipate the number and degree of bends needed in the course of constructing even the most simple structures.

While a fastener need not be inserted through each and every finger or portion of the palm, it is desirable to form one or more nail openings in each finger and palm portion. All nail openings must meet code requirements with respect to distance from edges of the sheet metal and from each other.

Another objective of the present invention is to provide a universal jointing member which permits the use of a single standard rather than a combination of long and short nails. Since many of the fasteners will be driven into the narrow dimension of the lumber, simply driving a long fastener at right angles to the face of the connector would result in driving it entirely through and out the other side of the wood member. In addition, driving a long nail at an angle can result in substantially increasing the holding valve of the joint by first driving the fastener through the nail opening in the connector and then through two, not just one, connecting wood member. The use of special nail openings is taught in my previous patents; Gilb, U.S. Pat. No. 4,291,996; 1981; and Gilb, U.S. Pat. No. 4,230,416, 1980. The use of these special nail openings to achieve dramatically increased holding power through the use of the principle of double shear is taught in my U.S. patent entitled Double Shear Angled Fastener Connector, filed Mar. 4, 1983, patented Nov. 6, 1984, U.S. Pat. No. 4,480,941. All three of these references will be described more fully herein.

For the first time, in a practical way, the present connector makes possible the joining of wood members edge to edge. This is a near-impossible problem when using conventional carpentry methods that require narrow edge nailing. It opens up the practical possibility of flat aspect 2-by construction suitable for sheds and other thin wall partition structures. At the same time, the identical device is suitable for joint-enhanced attachment of conventional stud construction (flat plates and transverse studs) or any combination of flat to edge jointing.

BRIEF DESCRIPTION OF THE DRAWINGS

FIG. 1 is a perspective view of the jointing connector of the present invention attached to the end of a wood element such as a 2×4 shown in phantom line. A suggested nail pattern is shown in phantom line.

FIG. 2 is a perspective view of the jointing connector of FIG. 1 with portions bent to receive a wood cross member in edge to edge contact with a wood stud shown in phantom line. A suggested fastener pattern is shown in phantom line.

FIG. 15 is an enlarged detail taken in the vicinity of line 15—15 of FIG. 2. The detail illustrates a prior art nail opening first shown in my U.S. Pat. No. 4,291,996.

FIG. 16 is a sectional view taken along line 16—16 of FIG. 15.

DESCRIPTION OF THE PREFERRED EMBODIMENT

Figure 3:
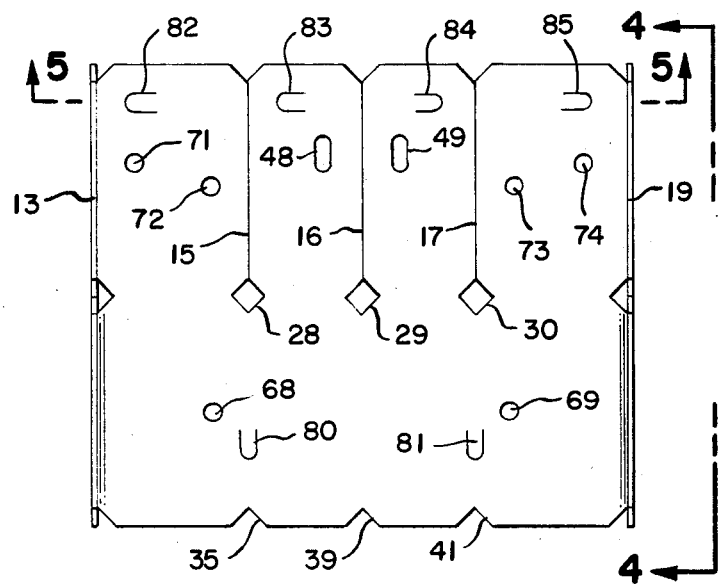
FIG. 3 is an elevation view of the jointing connector shown in FIG. 1.
Figures 4, 5:
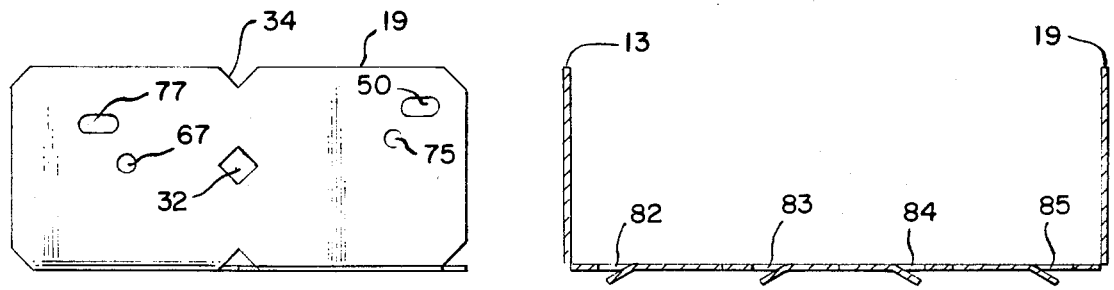
FIG. 4 is a side view of the jointing connector of FIG. 3 taken along line 4—4.
FIG. 5 is a sectional view of the jointing connector shown in FIG. 3 taken along line 5—5.

The sheet metal jointing connector of the present invention is used for joining wood framing members. The jointing connector is cut from a sheet metal blank member 1 which includes an elongated palm member 2 which has a width substantially greater than its length. The palm member is subdivided into an elongated mid-palm member 3 and first and sixth palm portions 4 and 5 formed on opposite sides of the mid-palm member. Integrally attached to the palm member and extending therefrom is a multiple finger portion 6 which is subdivided into first, second, third, fourth, fifth and sixth separate elongated generally parallel finger members which are consecutively designated by the numbers 7, 8, 9, 10, 11, and 12. Each of the fingers are bordered by border lines which may be bordered by a line of any configuration so long as the finger is a generally straight member. Preferably, the border lines are straight lines which are consecutively numbered and designated by only a single edge border line for purposes of simplicity as numbers 13-19.

Each finger may be bent 180° in either direction along a straight line illustrated in the drawings as broken lines 20-25. The bend lines are located at the juncture of each of the finger members and the palm member. The bends are to be performed in the field with a pair of pliers, hammer or other suitable tool. To easily effect the field bend at a factory designated bend line, a finger bend line means is provided which may consist of a weakened plane but preferably consists of cutout portions in the blank such as the diamond shaped cutouts 26-32 and V-notches 33 and 34.

A first palm bend line means is similarly formed in the palm area and includes the diamond shaped cutout 27 and V-notch 35. Bending thus occurs along a first palm bend line 36 which is located in alignment with edge border line 14 between first finger 7 and second finger 8.

A fifth bend line means consisting of a diamond shaped opening 31 and V-notch 37 delineates the sixth palm portion along fifth palm bend line 38 which is in alignment with edge border line 18 between the fifth and sixth finger members 11 and 12.

Each palm portion and each finger is formed with fastener openings therethrough which will be described in greater detail.

As an optional feature, the blank member 1 may be formed with additional bend line means for forming field bends in the palm member 2. A second palm bend line means, for example, may be provided by forming a V-notch 39 in the mid-palm portion for selectively forming a second palm bend line 40 in alignment with the edge border line 15 between fingers 8 and 9.

A third palm bend line means may be formed in the palm member by forming a V-notch 41 in the mid-palm portion for selectively forming a third palm bend line 42 in alignment with edge border 16 between the third and fourth finger members 9 and 10.

A fourth palm bend line means may also be formed in the palm member by forming a V-notch 43 in alignment with edge border 17 between the fourth and fifth finger members 10 and 11 which selectively forms fourth palm bend line 44.

While the jointing connector of the present invention may be sold as a sheet metal blank with all of the bends to be made by workmen in the field, preferably two bends are made at the factory forming the blank into a U-shape. Specifically, the first palm portion 4 is disposed in a plane generally at right angles to the plane of the mid-palm member 3 by forming a substantially 90 degree bend along first palm bend line 36. Because of the cut along border line 14, first finger 7 is also disposed at 90 degrees to the mid-palm portion. In addition, sixth palm portion 5 and sixth finger 12 are disposed in a plane generally at right angles to the plane of the mid-palm member by forming a substantially 90 degree bend along fith palm bend line 38.

Some variation in finger length could be made, but for uniformity and economy of fabrication, each of the finger members is preferably constructed with substantially the same length. With respect to the palm member, the most economical size in terms of economy of structure is to form the palm member with a length substantially equal to the length of the fingers.

The widths of the fingers are determined by the size of the wood members to be joined. Where the nominal widths of the wood members are wider, the finger widths are corresponding wider. A key to the connector, however, is to form the widths of the first and sixth finger members substantially equal and to form the second and third fingers so that the sum of their widths is substantially equal to the sum of the widths of the third and fourth fingers.

The six fingered jointing connector with standard circular nail openings has never before been known to the framing industry. Such a connector could be used in many applications to great advantage. Since all nails would be driven at 90 degrees to the face of the connector, the workman would have to ensure that the wood elements were of sufficient thickness to drive the nail without it protruding on the other side. Different length nails could be used, but it is a bother to workmen who are attempting to effect high production to carry two lengths of nails and to be constantly switching from one size to the other. To remedy this problem, the present invention is formed with slotted openings as described in my previous patent U.S. Pat. No. 4,230,416. While the slotted openings in my U.S. Pat. No. 4,230,416 were for the purpose of permitting nails to be driven in acute angle hangers, the use of slotted openings in the present application is for an entirely different purpose. The purpose of the slots in the present application is to enable a workman to use nails all having the same length in a particular jointing situation without having the nails protrude through and out the other side of the wood elements. For example, in making the joint shown in FIG. 2, if the members are nominal 2×4 lumber and placed on edge as shown, a standard $2\frac{3}{4}$ inch long nail will extend through the $1\frac{1}{2}''$ thickness and protrude beyond a distance of $1\frac{1}{4}''$. This would of course be unacceptable in most instances. On the other hand, by forming a slot in the metal connector, the nail may be driven at an angle so that it will not protrude beyond the wood member. Specifically, the restricted slot opening used at selected locations are formed with a width which is slightly larger than the uniform diameter of the nail fastener so that when the nail is inserted through the opening, the opposite edges of the slot will be in light frictional contact with the opposite sides of the nail, thus preventing relative movement between the nail and the connector in a transverse direction. In addition, the length of the slot is selected having a dimension greater than the diameter of the nail fastener but limited in length so that when the nail is driven at a selected angle, the opposed edges at the long ends of the slot will tangentially register with the opposed sides of the nail fastener. Thus, with the slot so dimensioned, substantially all relative movement between the fastener and connector is prevented.

Figure 6:
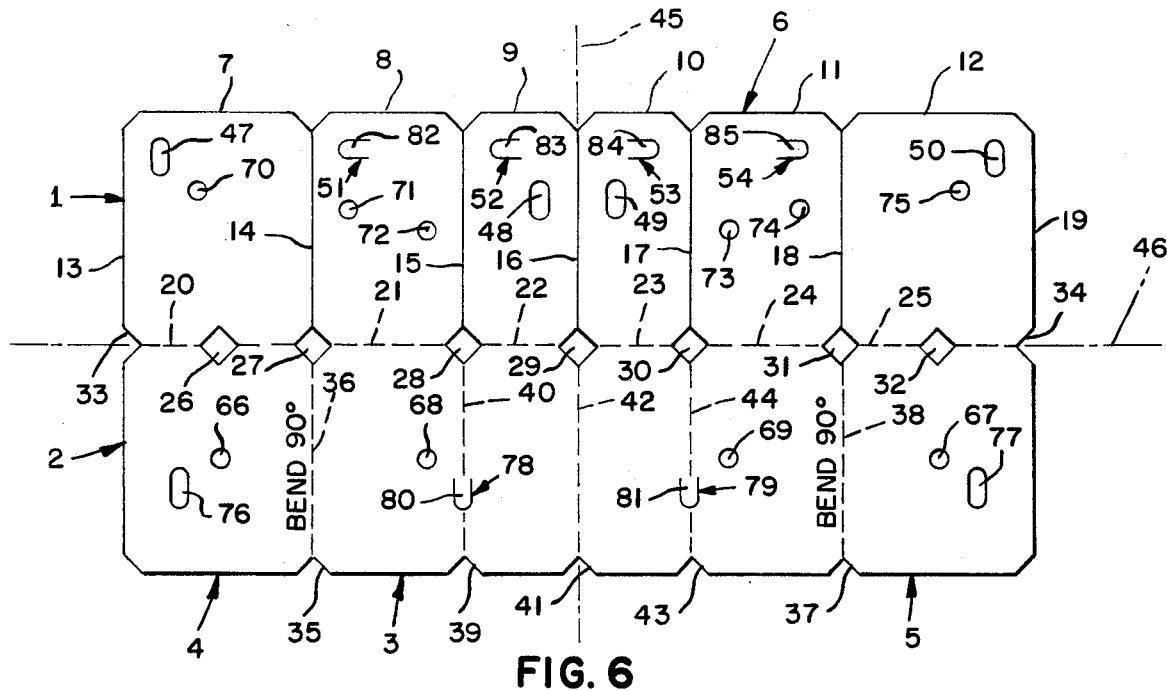
FIG. 6 is a top plan view of the jointing connector of FIG. 1 shown in an unbent blank form.

The placement and orientation of the slotted openings may be understood with reference to FIG. 6 and the following description. The blank member, as previously described is generally rectangular and has a length axis 45 and a substantially orthogonally related width axis 46. The first, third, fourth and sixth finger members 7, 9, 10 and 12 and the first and sixth palm portions 4 and 5 are each formed with an elongated slotted fastener opening which is elongated in a direction substantially parallel to the length axis of the rectangular blank member. These openings are consequtively numbered 47–50, 76 and 77. The slotted openings are dimensioned as previously described and are adapted for receiving an elongated fastener such as a nail at an angle up to substantially a 45 degree angle to the face of the respective finger member or palm portion and substantially parallel to the length axis.

The mid-palm member may be formed with at least a pair of spaced slotted fastener openings 78 and 79 dimensioned and oriented and adapted for receiving an elongated fastener in each opening at an angle up to substantially a 45 degree angle to the face of the mid-palm member and substantially parallel to the length axis 45. Preferably, however, openings 78 and 79 will be formed as directional slotted tab member openings described below.

The second, third, fourth and fifth finger members may also be formed with an elongated slotted fastener opening consecutively numbered as 51, 52, 53 and 54 which is elongated in a direction substantially parallel to the width axis 46 of the rectangular blank member and adapted for receiving an elongated fastener in each of the openings at an angle up to substantially a 45 degree angle to the face of the respective finger members and substantially parallel to the width axis. Again, however, it is preferred to form these openings as directional slotted tab members.

In order to make the jointing connector as universal as possible and to maximize the effectiveness in terms of the greatest strength with the minimum number of nails, the fastener openings should be formed in the following manner with respect to the blank connector illustrated in FIG. 6. Slotted openings 51–54, 78 and 79 previously referred to should instead be formed in the manner taught in my patent U.S. Pat. No. 4,291,996 and used wherever possible in the manner taught in my U.S. Pat. No. 4,480,941, patented Nov. 6, 1984. In my U.S. Pat. No. 4,291,996, the special nail opening is used with a hanger connector to prevent initial wood splitting and to solve a special problem specific to hanger applications in which orthogonally driven nails can cause beam splitting with the application and reapplication of loads.

In the present application, the reason for the special directional slotted tab member openings is entirely different. In the present application, angle nailing prevents through piercing of the wood member as previously described, but more importantly, the directional slotted tab member openings cause the nail fastener to be in double shear holding as taught in my U.S. Pat. No. 4,480,941. The opening and tab which is sometimes referred to as a "positive nail angling" device is shown at 51-54, 78 and 79 and the following description is the same for all of these openings. Referring to FIGS. 15 and 16, the directional slotted tab members each consist of a slot-like opening 55 formed in the face 56 of the metal connector. The opening has a length greater than its width wherein the width is selected so that sides 57 and 58 of the slot register with opposite sides of the nail. A tab-like member 80 is formed from the displaced face material from the slot-like opening and bent along a bend line 60 which constitutes one end of the slot-like opening. The tab-like member is formed with a nail receiving surface 61 for positively receiving a side edge of the nail in generally parallel face to face relationship. The length of the slot-like opening is selected to receive the nail at a selected angle 62 in relation to the face 56 of the metal connector so that one side 63 of the shank of the nail is in touching or close fitting relation to one end 64 of the slot-like opening and the opposite side 65 of the nail shank is in touching or close fitting relation to the nail receiving surface 61 of the tab-like member 80. Thus with the above construction, the workman can only hammer the nail in the direction pre-determined at the factory by the direction of the slot and the angle of the tab.

Referring particularly to FIG. 6, the preferred nail opening pattern and special slot and directional slotted tab members is as follows. The first and sixth palm portions, the mid-palm member and the first, second, fifth and sixth finger members are formed with at least one circular opening dimensioned and adapted for receiving a fastener therethrough at an angle orthogonally to the face of the respective members. These circular nail openings have been given numbers 66-75. Second and fifth fingers 8 and 11 have been formed with two circular openings.

Directional slotted fastener openings 47-50, 76 and 77 as described above are formed in the first and sixth palm portions and the first, third, fourth, and sixth finger members so that their longitudinal axis are parallel to the central length axis 45.

Previously, openings 51-54, 78 and 79 were referred to as slotted openings. Preferably these slotted openings are specially formed as directional slotted tab members as previously described. In identifying these special directional slotted tab members, they are additionally numbered as 80-85. In all instances these directional slotted tab members are identical to the directional slotted tab member described in FIGS. 15 to 16.

Mid-palm member 3 is formed with at least a pair of directional slotted tab members 80 and 81 which have a longitudinal axis parallel to the central length axis 45 and are dimensioned and adapted for receiving fasteners therethrough at a generally selected acute angle to the face 56 of the member parallel to the central length axis and directed toward the central width axis 46. The second and third fingers are each formed with directional slotted fastener tab member openings 82 and 83 having a longitudinal axis parallel to the central width axis 46 dimensioned and adapted for receiving a fastener therethrough at a generally acute angle to the face of the finger member in a direction toward the central length axis 45. The fourth and fifth fingers 10 and 11 are each formed with directional slotted fastener tab member openings 84 and 85 which have a longitudinal axis parallel to the central width axis 46 dimensioned and adapted for receiving fasteners therethrough at a generally selected acute angle to the face of the finger members in a direction toward the central length axis 45.

In most instances, the jointing connector is initially mounted to an end of a member, typically a 2×4, as shown in FIG. 1. The factory U-shaped connector is placed against the end of the 2×4 98 so that first palm portion 4 is against wood edge face 91, mid-palm 3 is against wood side face 92 and sixth palm portion 5 is against wood edge face 93. The device is visually self-jigging in that diamond shaped cut outs should be placed even with wood end face 94. Nail 95 is then driven through opening 66 and nail 96 is then driven through nail opening 67.

FIG. 2 illustrates the use of the connector in mounting an edge mounted plate to an edge mounted stud 98. The U-shaped connector is first mounted on the stud as in FIG. 1 with nail 95 being driven through opening 66 of the first palm portion 4 and nail 96 is driven through opening 67 of sixth palm portion 5. First finger 7 may then be bent downwardly 90 degrees by simply striking it with a hammer or it may be prebent by any suitable means. Sixth finger 12 is then bent 90 degrees similarly and plate 97 is then placed on end 94 of stud 98. Plate nail 99 is then driven into edge 101 of plate 97 through nail opening 70 in first finger 7. Plate nail 100 is then driven into edge 101 through opening 75 in sixth finger 12. Angled nail 102 is then driven into face 103 of plate 97 through directional slotted tab opening 82. In like manner, angled nail 104 is driven into face 103 of plate 97 through directional slotted tab opening 85 in fifth finger 6. Note that by driving nails 102 and 104 at an angle, the 2¾" length remains within the plate. Finally, double shear nail 105 is driven into face 92 of stud 98 at an angle through directional slotted tab opening 80 through stud end 94 and into plate 97. In like manner, nail 106 is driven into stud face 92 through directional slotted tab opening 81 through stud end 94 and into plate 97. As taught in my U.S. Pat. No. 4,480,941, nails 105 and 106 hold stud 98 and plate 97 in double shear thereby nearly doubling the holding power of these two nails. The connection is held more securely than if the joint was toenailed; a task very difficult to accomplish, and less nails are used than in any other sheetmetal jointing connector known to applicant.

Figure 7:
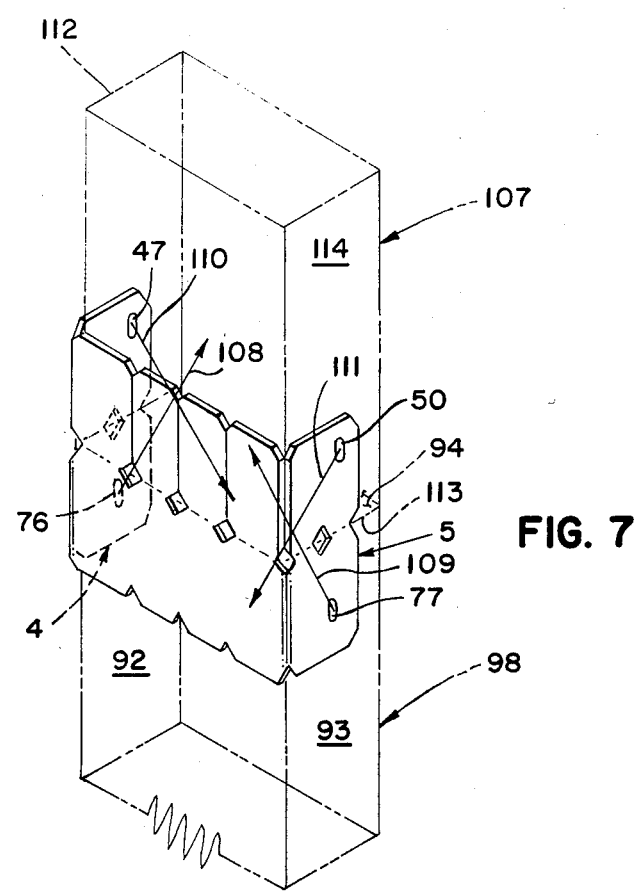
FIG. 7 is a perspective view of the jointing connector of FIG. 1. The phantom lines represent wood members, such as 2×4's, joined in end to end relationship. The phantom lines also indicate a suggested placement of fasteners.

FIG. 7 illustrates the preferred nailing schedule for an end butt splice. The studs may be vertical as shown or any other direction. The joint may be used for example as a rafter-end extender. The connector could also be used with scarfed end joints for maximum values.

In this example, a skilled workman would not place the connector on the end of one stud as illustrated in FIG. 1. Instead, the connector could be held against the end of stud 98 and double shear nail 108 could be driven through edge 92 of stud 98 through slot opening 76 in first palm portion 4, through end 94 and into stud 107. In like manner, double shear nail 109 is driven into edge 93 through slot opening 77 in sixth palm portion, through end 94 and into stud 107.

Stud 107 is now securely fastened to stud 98. The connection is next completed by driving double shear nail 110 into stud edge 112, through slot 47 in first finger 7, through stud end 113 of stud 107 and into stud 98. In like manner, double shear nail 111 is driven into stud edge 114, through slot 50 in sixth finger 12, through end 113 and into stud 98. Thus with only 4 nails, all of which are in double shear, a single connector is able to securely end-splice two 2×4 members.

Figure 8:
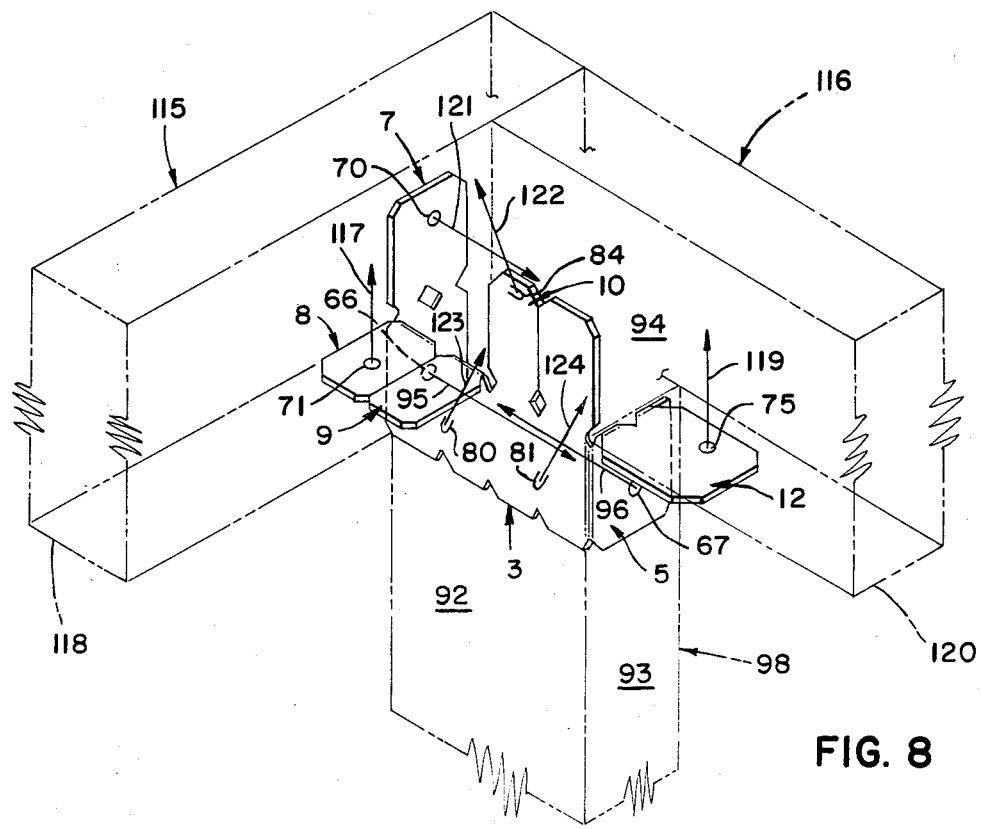
FIG. 8 is a perspective view of the jointing connector of the present invention with portions bent to join the end of a wood stud to two cross members in a typical corner detail. The wood members and a typical fastener pattern are illustrated in phantom line.

FIG. 8 illustrates the use of the connector to attach a vertical stud to the top (or bottom) of two edge mounted corner plates. The connector may be attached to the outside of the corner, but where sheathing is to be applied to the outside of the building, it is preferable to attach the connector to the inside, as illustrated, to avoid problems in nailing the sheathing over the connector. This connector represents a unique illustration of the economy of the present connector. Although only eight nails are used, each of the three wood elements is held by a minimum of four different nails.

To install the connector, it is first attached to stud 98 as in FIG. 1. Nail 95 is driven into edge 92 through opening 66. Nail 96 is driven into edge 93 through opening 67. Second finger 8 and third finger 9 and sixth finger 12 are then bent downwardly 90 degrees with a hammer or other tool. Top plates 115 and 116 are then placed on the end 94 as shown. Note that the stud could just as readily be resting on bottom plates corresponding to edge mounted 2×4's 115 and 116. Nailing can proceed in any order. Nail 117 may be driven into edge 118 of plate 115 through opening 71 in second finger 8. Nail 119 may then be driven into edge 120 of plate 116 through opening 75. The plates may next be attached together by driving nail 121 through opening 70 of first finger 7 through plate 115 and into plate 116. Double shear nail 122 may then be driven into stud 116 through directional slotted tab opening 84 in fourth finger 10 and into plate 115. Double shear nail 123 may then be driven into stud 98 through directional slotted tab opening 80, through stud edge 94 and into plate 115. Double shear nail 124 is then driven into stud 98 through directional slotted tab opening 81, through end edge 94 and into plate 116.

Figure 9:
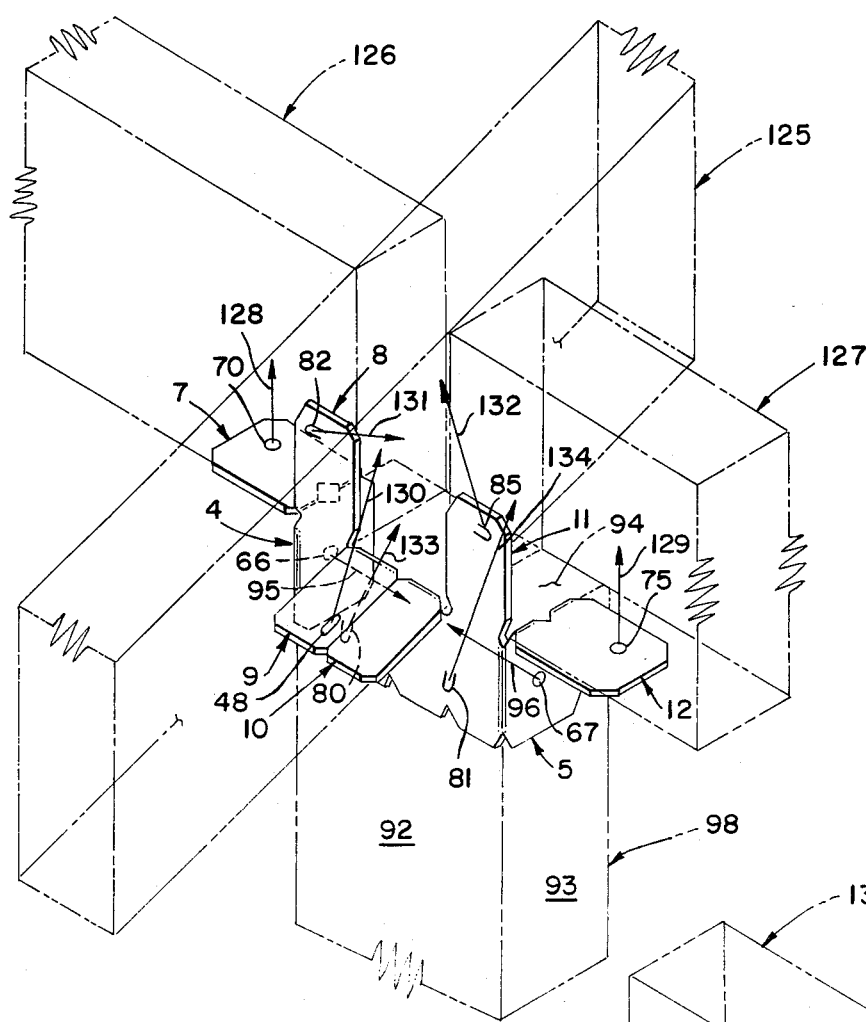
FIG. 9 is a perspective view of the jointing connector of the present invention with portions bent to join a pair of wood cross members and a rafter in a typical inside rafter detail. The wood members and a suggested nailing pattern are illustrated in phantom line.

FIG. 9 illustrates a typical inside rafter detail. Two cross members attached to a vertical stud would be similarly attached. The connector is first attached to stud 98 by nails 95 and 96 as previously described. First finger 7 and sixth finger 12 are bent at a 90 degree angle, and third and fourth fingers 9 and 10 are bent to the approximate angle of the rafter member 125. Rafter 125 is then placed on stud end 94 and cross members 126 and 127 are butted against the side faces of the rafter. The plate members are then attached by nails 128 and 129 driven through nail openings 70 and 75. The rafter 125 is then attached by driving nail 130 through slotted opening 48 in third finger 9.

The cross member 126, rafter 125 and the connector are secured together by driving double shear nail 131 through directional slotted tab opening 82 in second finger 8. The nail penetrates cross member 126 at an angle and enters rafter 125. Thus, nail 131 is in double shear and the load holding of the nail is double that of a nail in single shear in standard connectors. Next, double shear nail 132 is driven through directional slotted tab opening 85 in fifth finger 11, angularly through cross member 127 and into rafter 125. Again, the nail is in double shear and the load holding is doubled over a similar connection in which the nail is only in single shear.

Double shear nail 133 is then driven through directional slotted tab opening 80 through stud 98 and into cross member 126. The nail is held in double shear with the consequent doubling of holding power. Finally, double shear nail 134 is driven into stud 98 through directional slotted tab opening 81, through stud end 94 and into cross member 127. Again, the nail is in double shear which doubles the holding power.

Figure 10:
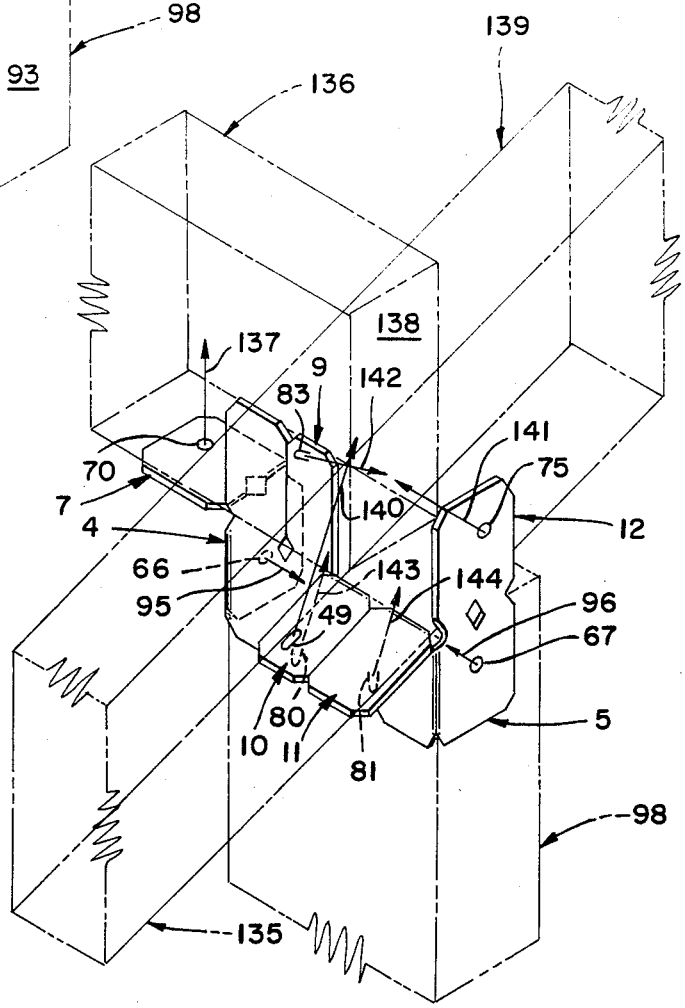
FIG. 10 is a perspective view of the jointing connector of the present invention with portions bent to join a cross wood member and a rafter in a typical end rafter detail. The wood members and a suggested nailing pattern are illustrated in phantom line.

FIG. 10 illustrates a typical end rafter or end cross member on a vertical stud. A suggested nailing pattern is as follows. The connector is first attached to the end of the stud by nail 95 through opening 66 in first palm portion 4 and nail 96 through opening 67 in sixth palm portion 5 as previously described. First finger 7 is then bent at 90 degrees and fourth finger 10 and fifth finger 11 are then bent to the approximate angle of rafter member 135. Cross member 136 and rafter 135 are then placed on stud 98 as shown and nail 137 is driven into plate 136 through opening 70 in first finger 7. End 138 of plate 136 is butted against side 139 of rafter 135. Rafter 135 is then secured by driving nail 140 through slot 49 in fourth finger 10 into rafter 135. Rafter 135 is then cross locked to plate 136 by driving nail 141 through opening 75 in sixth finger 12, through rafter 135 and into the end of plate 136. Double shear nail 142 is driven through directional slotted tab opening 83 diagonally through the end of plate 136 and into rafter 135. Double shear nail 143 is then driven through directional slotted tab opening 80 into stud 98 and into plate 136. Double shear nail 144 is then driven through directional slotted tab opening 81 through the end of stud 98 and into rafter 135. Double shear nails 142, 143, and 144 are all held on double shear thereby doubling their holding value.

Figure 11:
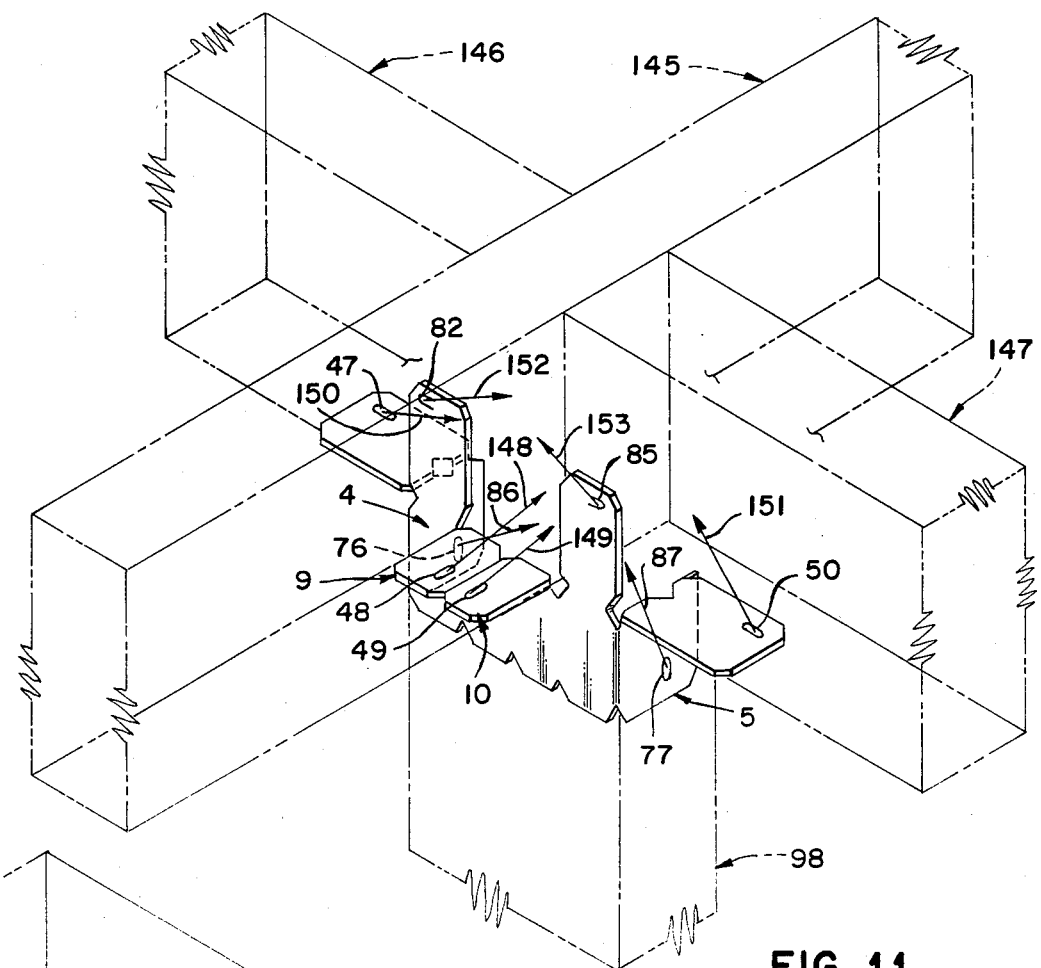
FIG. 11 is a perspective view of the jointing connector of the present invention attached to the end of a post with portions bent to connect a cross member and two end members. The wood elements and fasteners shown in a suggested nailing pattern are illustrated in phantom line.

FIG. 11 illustrates the use of the connector in a four-way support tie. A cross member 145 rests on the end of vertical stud 98 and plates 146 and 147 are butted against the cross member. All members have two-plane nails in shear plus optional use of double shear nailing for double connection values. The nailing pattern could be similar to the nailing pattern for the rafter of FIG. 9 or a more economical nailing pattern could be used as follows. Slant nails 148 and 149 are driven through slots 48 and 49 in third and fourth fingers 9 and 10 into cross member 145 at a slant angle. Slant nails 150 and 151 are then driven at an angle through slot openings 47 and 50 into plates 146 and 147 respectively.

Double shear nail 152 is driven through directional slotted tab opening 82 through the end of plate 146 and into cross member 145. Double shear nail 153 is then driven through directional slotted tab opening 85 through the end of plate 147 and into cross member 145. Double shear nails 152 and 153 are held in double shear and thus are given double the connection value of a single shear nail. Slant nail 86 is driven through slot opening 76 in first palm portion 4, into stud 98 and plate member 146. Slant nail 87 is driven through slot opening 77 in sixth palm portion 5 into stud 98 and into plate member 147. Both slant nails 86 and 87 are in double shear.

Figure 12:
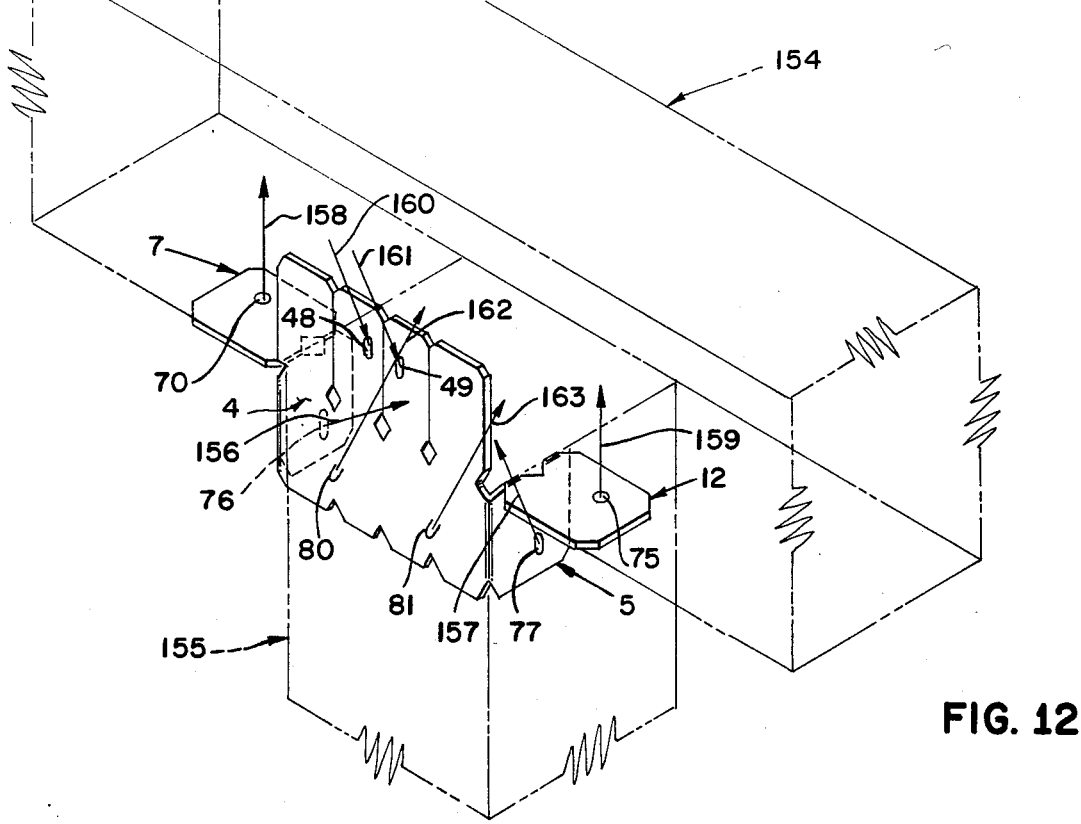
FIG. 12 is a perspective view of the jointing connector of the present invention connected to a 4×4 post with portions bent to receive a cross member. The wood elements and the fasteners shown in a typical nailing pattern are illustrated in phantom line.

FIG. 12 illustrates the use of the jointing connector for post cap use in joining a beam such as a 4×4 beam, 154 to a 4×4 post 155. The connector provides double the connecting value by use of angled and two-plane nailing. Only one connector is illustrated, but for even more secure nailing, a connector could be attached on the opposite side of the post and also connected to the beam. First finger 7 is bent at 90° outwardly and sixth finger 12 is bent 90° in the opposite direction. The connector is fastened to post 155 by driving slant nail 156 at an angle through slot 76 through the end of post 155 and into beam 154. In like manner, slant nail 157 is driven at an angle through slot 77 through the end of post 155 and into beam 154. Nail 158 is then driven through opening 70 in first finger 7 and nail 159 is driven through opening 75 in sixth finger 12 into beam 154. Slant nails 160 and 161 are then driven angularly downwardly through slotted openings 48 and 49 into beam 154 and down into the top of post 155. Both nails are held in double shear and the joint valve is doubled over a nail in single shear. Finally, double shear nails 162 and 163 are driven through directional slotted tab openings 80 and 81 into post 155 and into beam 154. Both nails 162 and 163 are in double shear and provide double the joint value as a single shear nail.

Figure 13:
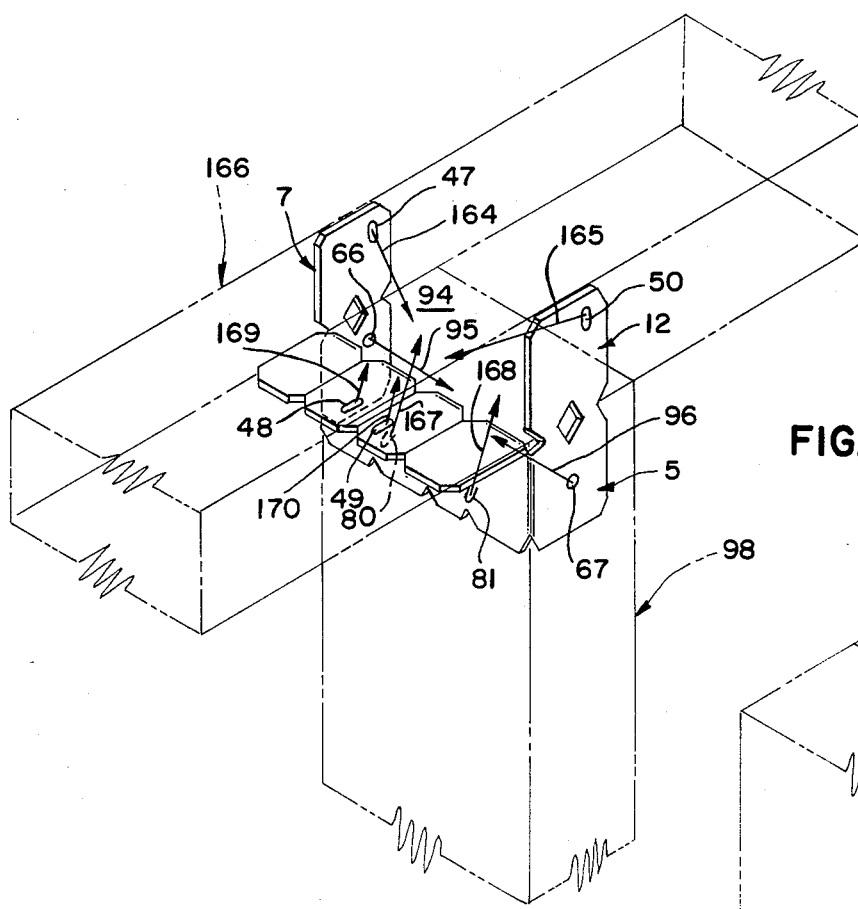
FIG. 13 is a perspective view of the connector of the present invention connected to the end of a 2×4 stud with portions bent to receive a cross member in flat aspect. The wood members and fasteners shown in a suggested nailing pattern are illustrated in phantom line.

FIG. 13 illustrates the use of the device as a stud connector for use at either the top or bottom of the stud. The connector is attached to stud 98 by driving nails 95 and 96 through openings 66 and 67 as previously described. Double shear slant nail 164 is then driven downwardly through slot 47 in first finger 7 into plate member 166 and into the end 94 of stud 98. Double shear slant nail 165 is then driven through slot 50 in sixth finger 12 into plate 166, through stud end 94 and into stud 98. Nails 164 and 165 are in double shear as driven. Double shear nails 167 and 168 are then driven through directional slotted tab openings 80 and 81 into stud 98, through stud end 94 and into plate member 166. It is optional to attach third and fourth fingers to the plate by driving double shear slant nails 169 and 170 through slots 48 and 49 into plate 166.

Figure 14:
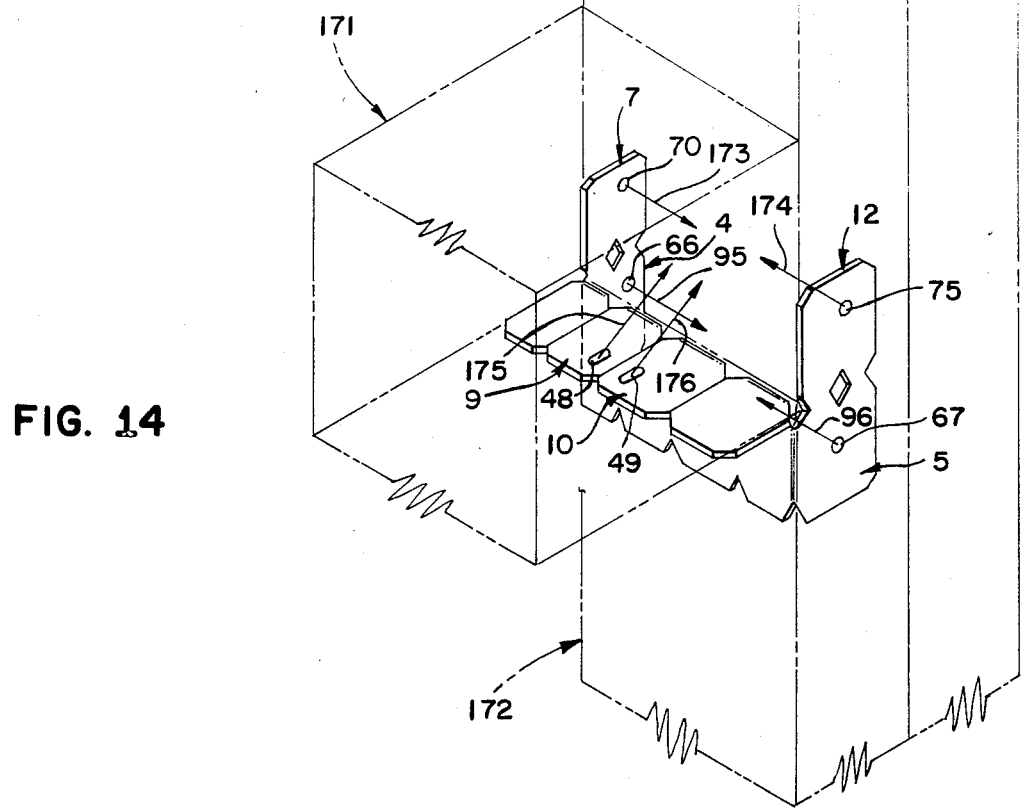
FIG. 14, is a perspective view of the jointing connector of the present invention connected to a double stud member with portions bent to receive a beam member. The wood element and fasteners shown in a typical nailing pattern are illustrated in phantom line.

FIG. 14 illustrates the use of the connector of the present invention for attaching a header member such as a 4×4 member 171 to a 4×4 post or double stud 172. The connector is first attached to the post by nails 95 and 96, driven through openings 66 and 67 in first and sixth palm portion members 4 and 5. Nail 173 is then driven through opening 70 in first finger member 7 into post 172. Nail 174 is then driven through opening 75 in sixth finger 12 into post 172. Finally, double shear slant nails 175 and 176 are driven through slot openings 48 and 49 in third and fourth fingers 9 and 10, into header 171 and then into post 172. Nails 175 and 176 are in double shear and therefore obtain double the joint valve of a single shear nail.

I claim:

1. A sheet metal jointing connector for joining wood framing members comprising:
  a. a generally rectangular planar blank member;
  b. said blank member includes an elongated palm member having a width substantially greater than its length, subdivided into an elongated mid-palm member and first and sixth palm portions formed on opposite sides of said mid-palm member;
  c. said blank member also includes a multiple finger portion extending from said palm member and subdivided into first, second, third, fourth, fifth and sixth separate elongated generally parallel finger members each defined by edge border lines;
  d. finger bend line means for forming a plurality of generally straight and generally aligned finger bend lines at the juncture of each of said finger members and said palm member;
  e. first palm bend line means formed in said palm area delineating said first palm portion permitting bending along a first palm bend line in alignment with said edge border lines between said first and second fingers;
  f. fifth palm bend line means formed in said palm member delineating said sixth palm portion along a fifth palm bend line in alignment with said edge border lines between said fifth and sixth finger members; and
  g. said palm member and each of said finger members are formed with fastener openings therethrough.

2. A connector as described in claim 1 comprising:
  a. second palm bend line means formed in said mid-palm portion for selectively forming a second palm bend line in alignment with said edge border lines between said second and third finger members;
  b. third palm bend line means formed in said palm member for selectively forming a third palm bend line in alignment with said edge border lines between said third and fourth finger members; and
  c. fourth palm bend line means formed in said palm member for selectively forming a fourth palm bend line in alignment with said edge border lines between said fourth and fifth finger members.

3. A connector as described in claim 1 comprising:
  a. said first palm portion is disposed in a plane generally at right angles to the plane of said mid-palm member by forming a substantially 90 degree bend along said first palm bend line; and
  b. said sixth palm portion is disposed in a plane generally at right angles to the plane of said mid-palm member by forming a substantially 90 degree bend along said fifth palm bend line.

4. A connector as described in claim 1 comprising:
  a. each of said fingers have substantially the same length;
  b. the length of said palm member is substantially equal to the length of said fingers;
  c. the widths of said first and sixth finger members are substantially equal; and
  d. the sum of the widths of said second and third finger members are substantially equal to the sum of the widths of said fourth and fifth finger members.

5. A connector as described in claim 1 comprising:
  a. said blank member is a generally rectangular member having a length axis and a substantially orthogonally related width axis;
  b. said first and sixth finger members and said first and sixth palm portions are each formed with an elongated slotted fastener opening which is elongated in a direction substantially parallel to said length axis of said rectangular blank member adapted for receiving an elongated fastener in each of said openings at an angle up to substantially a 45 degree angle to the face of said respective finger member and palm portion and substantially parallel to said length axis;
  c. said mid-palm member is formed with at least a pair of spaced slotted fastener openings dimensioned and oriented and adapted for receiving an elongated fastener in each of said openings at an angle up to substantially a 45 degree angle to the face of said mid-palm member and substantially parallel to said length axis; and
  d. said second, third, fourth and fifth finger members are each formed with an elongated slotted fastener opening which is elongated in a direction substantially parallel to said width axis of said rectangular blank member adapted for receiving an elongated fastener in each of said openings at an angle up to substantially a 45 degree angle to the face of said respective finger members and substantially parallel to said width axis.

6. A connector as described in claim 1 comprising:

a. said blank member is a generally rectangular member having a central length axis bisecting said connector and parallel to the length dimension of said connector and a central width axis bisecting said connector and parallel to the width dimension of said connector;
b. said first and sixth palm portions, said mid-palm member and said first, second, fifth and sixth finger members are formed with at least one circular opening dimensioned and adapted for receiving a fastener therethrough at an angle orthogonally to the face of said respective members;
c. said first and sixth palm portions, and said first, third, fouth, and sixth finger members are formed with directional slotted fastener openings having a longitudinal axis parallel to said central length axis of said connector dimensioned and adapted for receiving a fastener therethrough parallel to said central length axis and at an acute angle to the faces of said members;
d. said mid-palm member, is formed with at least a pair of directional slotted tab members having a longitudinal axis parallel to said central length axis dimensioned and adapted for receiving fasteners therethrough at a generally selected acute angle to said face of said member parallel to said central length axis and directed toward said central width axis;
e. said second and third finger members are each formed with directional slotted fastener tab member openings having a longitudinal axis parallel to said central width axis dimensioned and adapted for receiving a fastener therethrough at a generally selected acute angle to the face of said finger member in a direction toward said central length axis; and
f. said fourth and fifth fingers are each formed with directional slotted fastener tab member openings having a longitudinal axis parallel to said central width axis dimensioned and adapted for receiving fasteners therethrough at a generally selected acute angle to the face of said finger members in a direction toward said central length axis.

* * * * *